C. L. BOPP.
EQUIPMENT FOR LOCOMOTIVES.
APPLICATION FILED MAR. 14, 1912.
1,085,011.
Patented Jan. 20, 1914.
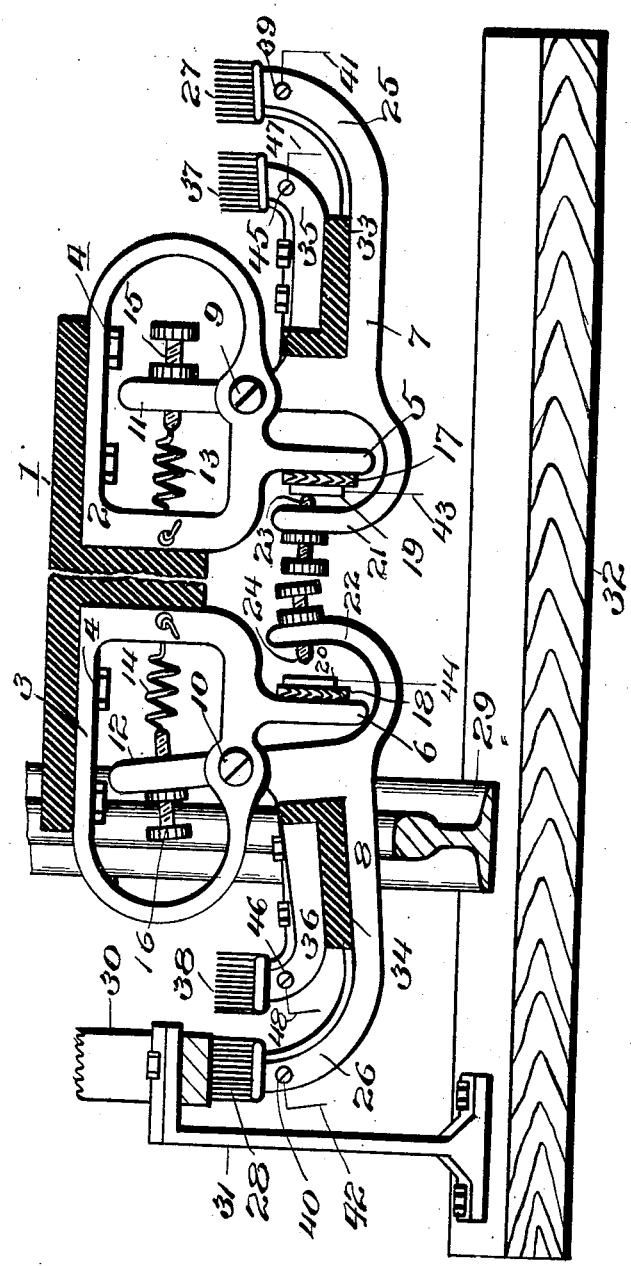
Witnesses
J. M. Fowler Jr.
L. L. Morrill
Inventor
Clinton L. Bopp,
By Mason Fenwick & Lawrence,
Attorneys

UNITED STATES PATENT OFFICE.

CLINTON L. BOPP, OF WATERLOO, IOWA.

EQUIPMENT FOR LOCOMOTIVES.

1,085,011. Specification of Letters Patent. Patented Jan. 20, 1914.

Application filed March 14, 1912. Serial No. 683,849.

*To all whom it may concern:*

Be it known that I, CLINTON L. BOPP, a citizen of the United States, residing at Waterloo, in the county of Blackhawk and State of Iowa, have invented certain new and useful Improvements in Equipment for Locomotives; and I do hereby declare the following to be a full, clear, and exact description of the invention, such as will enable others skilled in the art to which it appertains to make and use the same.

This invention relates to equipment for locomotives and has for an object to provide a brush attachment for taking current from a third rail primarily intended for use in operation with the signaling and controlling apparatus which forms the subject matter of a co-pending application, Serial No. 683,848, filed Mar. 14, 1912, although not limited to such association in use.

A further object of the invention is to provide means to attach to the under side of any approved part of a locomotive embodying brushes extending laterally beyond the traction rail into position for engaging an outer third rail and embodying improved features of convenience and reliability.

With these and other objects in view the invention comprises certain novel constructions, combinations and arrangement of parts as will be hereinafter more fully described and claimed.

The drawing is a view in side elevation of the improved structure shown in association with a traction rail seen in perspective.

The improved equipment disclosed in the acompanying drawing comprises a T-shaped plate 1 of insulating material which is secured in any convenient and approved place upon the under side of any approved part of a locomotive. To the plate 1 brackets 2 and 3 are secured in any approved manner as by the bolts 4 such brackets being preferably substantially D-shaped with downwardly extending arms 5 and 6.

To the under side of the D-shaped brackets arms 7 and 8 are pivoted as at 9 and 10 to swing in vertical planes. The arms 7 and 8 are respectively provided with uprights 11 and 12 which are located substantially within the curve of the D-shaped brackets and springs 13 and 14 are provided to hold the said arms 7 and 8 normally yieldingly upward. The tension of the springs 13 and 14 is controlled by screws 15 and 16 whereby the arms may be held upwardly with any desired degree of tension.

The downwardly extending arms 5 and 6 carry insulating blocks 17 and 18 with contact blocks 19 and 20 secured thereon. The arms 7 and 8 carry curved upwardly extending portions 21 and 22 which respectively carry contact screws 23 and 24 positioned to engage with the contact blocks 19 and 20 when the arms 7 and 8 are held upwardly in normal position by the springs 13 and 14.

At their outer ends the arms 7 and 8 are curved upwardly as shown at 25 and 26 and carry brushes 27 and 28 positioned for engagement with the under side of charged third rails spaced beyond the traction rails one of which is shown at 29. One of the third rails is shown at 30 supported upon a bracket 31 which in turn is supported upon one of the cross ties 32. The arms 7 and 8 respectively carry insulating blocks 33 and 34 with auxiliary arms 35 and 36 secured thereon which said auxiliary arms respectively carry brushes 37 and 38 positioned to engage with other and differently spaced third rails not shown.

The arms 7 and 8 are provided with binding screws 39 and 40 to which are connected wires 41 and 42 leading to any desired signaling or controlling apparatus circuit being made through wires 43 and 44 carried by the insulating blocks 19 and 20 respectively. The auxiliary arms 35 and 36 are likewise provided with binding screws 45 and 46 to which are connected wires 47 and 48, return being made in any approved manner as through the wheels of the locomotive to ground.

The system of wiring which is connected with the improved equipment shown in the drawing is wholly immaterial to the present application but such a system as is preferably used in connection with this device is shown in the aforesaid coincidentally filed application.

I claim:—

1. In a locomotive equipment, a bracket extending beneath any approved part of a locomotive and insulated therefrom, an arm depending from said bracket, a contact member pivoted to said bracket, said contact member having a curved arm bent around the depending arm of the bracket, a contact plate secured to, but insulated from the depending arm, a contact carried by the curved arm adapted to engage the contact plate, and means for moving the contact member so as to disengage the contact carried by the curved arm from the contact plate.

2. In a locomotive equipment, a bracket secured to but insulated from the locomotive, a contact member pivoted to said bracket, an upbent arm carried by the contact member, a contact carried by the upbent arm, a downwardly extending arm secured to the bracket and adapted to pass between the contact member and the upbent arm, a contact plate carried by said depending member adapted to engage the contact of the upbent arm, and means for producing relative motion between the bracket and the contact member.

3. In a locomotive equipment, a bracket secured to, but insulated from the locomotive, a contact member pivoted to said bracket, contacts carried by the bracket and contact member adapted to touch as the contact member moves about its pivot, an upturned arm extending from the contact member, and a brush carried by said upturned arm adapted to engage an obstruction to depress the upturned arm for breaking the contacts.

In testimony whereof I affix my signature in presence of two witnesses.

CLINTON L. BOPP.

Witnesses:
ARTHUR R. MUTTON,
F. P. HURST.

---

Copies of this patent may be obtained for five cents each, by addressing the "Commissioner of Patents, Washington, D. C."